US012203490B1

(12) United States Patent
Schaefer et al.

(10) Patent No.: US 12,203,490 B1
(45) Date of Patent: Jan. 21, 2025

(54) HYDRAULIC DRIVE SYSTEM FOR A CONSTRUCTION AND/OR THICK MATTER PUMP SYSTEM, CONSTRUCTION AND/ OR THICK MATTER PUMP SYSTEM, AND METHOD FOR OPERATING A HYDRAULIC DRIVE SYSTEM AND/OR A CONSTRUCTION AND/OR THICK MATTER PUMP SYSTEM

(71) Applicant: Putzmeister Engineering GmbH, Aichtal (DE)

(72) Inventors: Michael Schaefer, Gaeufelden-Tailfingen (DE); Alexander Pronko, Nuertingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 18/708,260

(22) PCT Filed: Nov. 7, 2022

(86) PCT No.: PCT/EP2022/080942
§ 371 (c)(1),
(2) Date: May 8, 2024

(87) PCT Pub. No.: WO2023/083735
PCT Pub. Date: May 19, 2023

(30) Foreign Application Priority Data

Nov. 12, 2021 (DE) ..................... 10 2021 212 758.8

(51) Int. Cl.
*F15B 11/16* (2006.01)
*E02F 9/08* (2006.01)
(Continued)

(52) U.S. Cl.
CPC ............ *F15B 11/16* (2013.01); *E02F 9/0883* (2013.01); *E02F 9/2203* (2013.01);
(Continued)

(58) Field of Classification Search
CPC ....... F15B 11/16; E02F 9/2203; E02F 9/2267; E02F 9/26
See application file for complete search history.

(56) References Cited

U.S. PATENT DOCUMENTS 3,380,388 A 4/1968 Sherrod
5,993,181 A 11/1999 Hudelmaier
(Continued)

FOREIGN PATENT DOCUMENTS

DE 195 03 986 A1 8/1996
DE 10 2005 008 217 A1 8/2006
(Continued)

OTHER PUBLICATIONS

International Search Report (PCT/ISA/210) issued in PCT Application No. PCT/EP2022/080942 dated Jan. 31, 2023 with English translation (5 pages).
(Continued)

*Primary Examiner* — Abiy Teka
(74) *Attorney, Agent, or Firm* — Crowell & Moring LLP

(57) ABSTRACT

A hydraulic drive system for a construction and/or thick matter pump system includes a first drive cylinder and a second drive cylinder, a first directional valve and a second directional valve, and a flushing hydraulic liquid device. The first directional valve is configured to connect the first drive cylinder to the second directional valve by way of a first switching position and to connect the second directional valve to the flushing hydraulic liquid device by way of a second switching position. The second directional valve is configured to connect the second drive cylinder to the first directional valve by way of a first switching position and to connect the first directional valve to the flushing hydraulic liquid device by way of a second switching position.

16 Claims, 3 Drawing Sheets

(51) Int. Cl.

| | |
|---|---|
| ***E02F 9/22*** | (2006.01) |
| ***E02F 9/26*** | (2006.01) |
| ***F04B 9/117*** | (2006.01) |

(52) U.S. Cl.

CPC .............. *E02F 9/2267* (2013.01); *E02F 9/26* (2013.01); *F04B 9/117* (2013.01); *E02F 9/2292* (2013.01)

(56) References Cited

U.S. PATENT DOCUMENTS

| | | | |
|---|---|---|---|
| 2007/0204608 A1 | 9/2007 | Von Baumen et al. | |
| 2008/0014106 A1 | 1/2008 | Hofmann et al. | |
| 2021/0164497 A1 | 6/2021 | Veit | |

FOREIGN PATENT DOCUMENTS

| | | | | | |
|---|---|---|---|---|---|
| DE | 102017206394 A1 | * | 10/2017 | ................ F04B 1/12 |
| DE | 10 2018 209 513 B3 | | 10/2019 | |
| JP | 5134891 B2 | * | 1/2013 | |
| WO | WO-2019022593 A1 | * | 1/2019 | .............. F04B 15/02 |

OTHER PUBLICATIONS

German-language Written Opinion (PCT/ISA/237) issued in PCT Application No. PCT/EP2022/080942 dated Jan. 31, 2023 with English translation (9 pages).

* cited by examiner

| 5 | 6 | |
|---|---|---|
| 5S2 | 6S2 | AHAF |
| 5S1 | 6S2 | WAF |
| 5S2 | 6S1 | WAF |
| 5S1 | 6S1 | ZSF |

HYDRAULIC DRIVE SYSTEM FOR A CONSTRUCTION AND/OR THICK MATTER PUMP SYSTEM, CONSTRUCTION AND/ OR THICK MATTER PUMP SYSTEM, AND METHOD FOR OPERATING A HYDRAULIC DRIVE SYSTEM AND/OR A CONSTRUCTION AND/OR THICK MATTER PUMP SYSTEM

FIELD OF APPLICATION

The invention relates to a hydraulic drive system for a construction and/or thick matter pump system, a construction and/or thick matter pump system having such a hydraulic drive system, and a method for operating such a hydraulic drive system and/or such a construction and/or thick matter pump system.

BACKGROUND AND SUMMARY

The invention addresses the problem of providing a hydraulic drive system for a construction and/or thick matter pump system, a construction and/or thick matter pump system having such a hydraulic drive system, and a method for operating such a hydraulic drive system and/or such a construction and/or thick matter pump system, in each case having improved properties.

The invention solves this problem by providing a hydraulic drive system, a construction and/or thick matter pump system, and a method in accordance with the independent claims. Advantageous developments and/or refinements of the invention are described in the dependent claims.

The hydraulic drive system according to the invention for a construction and/or thick matter pump system has a first drive cylinder and a second drive cylinder, a first directional control valve and a second directional control valve, and a flushing hydraulic fluid device. The first directional control valve, in particular itself, is configured by a first switching position or in a first switching position for connecting the first drive cylinder to the second directional control valve or connects them to each other. Furthermore, the first directional control valve, in particular itself, is configured by a second switching position or in a second switching position for connecting the second directional control valve to the flushing hydraulic fluid device or connects them to each other. The second directional control valve, in particular itself, is configured by a first switching position or in a first switching position for connecting the second drive cylinder to the first directional control valve or connects them to each other. In addition, the second directional control valve, in particular itself, is configured by a second switching position or in a second switching position for connecting the first directional control valve to the flushing hydraulic fluid device or connects them to each other.

This permits, in particular the switching positions and the connections permit, various functions of the hydraulic drive system, in particular for the first drive cylinder and/or the second drive cylinder, with, in particular only, the first directional control valve and the second directional control valve. This therefore permits a cost-effective construction of the hydraulic drive system.

In particular, the first drive cylinder and the second drive cylinder may be identical and/or different.

The first directional control valve and the second directional control valve may be identical and/or different.

The, in particular respective, first switching position and the, in particular respective, second switching position may be different.

At one time, the first directional control valve may be, in particular either, in the first switching position or the second switching position. In addition or alternatively, at one time, the second directional control valve may be, in particular either, in the first switching position or the second switching position.

The first directional control valve and/or the second directional control valve may be switchable or adjustable or activatable or controllable.

The first directional control valve may be connected to the first drive cylinder, the second directional control valve and the flushing hydraulic fluid device or attached thereto. In addition or alternatively, the first directional control valve may not or does not need to be connected to the second drive cylinder, in particular without the second directional control valve, or attached thereto.

The second directional control valve may be connected to the second drive cylinder, the first directional control valve and the flushing hydraulic fluid device or attached thereto. In addition or alternatively, the second directional control valve may not or does not need to be connected to the first drive cylinder, in particular without the first directional control valve, or attached thereto.

Connected may be permanent in terms of time and/or independent of the, in particular respective, first switching position and the, in particular respective, second switching position.

The, in particular respective, connection connects and/or can be connected, in particular by means of, in particular, only one, in particular respective, conduit, and/or directly and/or for a flow of hydraulic fluid, in particular from the respectively first-mentioned element to the respectively second-mentioned element and/or between said elements.

The hydraulic fluid may comprise, in particular be, oil.

The word element “discharging” may be used synonymously for the word element “flushing”.

In a development of the invention, the first directional control valve is configured by the first switching position not for connecting the first drive cylinder to the flushing hydraulic fluid device, in particular without the second directional control valve, and not for connecting the second directional control valve to the flushing hydraulic fluid device, or does not connect them to each other. In addition or alternatively, the first directional control valve is configured by the second switching position not for connecting the first drive cylinder to the second directional control valve and not for connecting the first drive cylinder to the flushing hydraulic fluid device, or does not connect them to each other. Further in addition or alternatively, the second directional control valve is configured by the first switching position not for connecting the second drive cylinder to the flushing hydraulic fluid device, in particular without the first directional control valve, and not for connecting the first directional control valve to the flushing hydraulic fluid device, or does not connect them to each other. Further in addition or alternatively, the second directional control valve is configured by the second switching position not for connecting the second drive cylinder to the first directional control valve and not for connecting the second drive cylinder to the flushing hydraulic fluid device, or does not connect them to each other. This permits, in particular the switching positions and the non-connections permit, the various functions.

In a development of the invention, a first cylinder port of the first directional control valve is connected to the first drive cylinder. A second cylinder port of the second directional control valve is connected to the second drive cylinder. A first flushing port of the first directional control valve is connected to the flushing hydraulic fluid device. A second flushing port of the second directional control valve is connected to the flushing hydraulic fluid device. A first valve port of the first directional control valve and a second valve port of the second directional control valve are connected to each other. The first directional control valve is configured by the first switching position for connecting the first cylinder port to the first valve port, or connects them to each other. Furthermore, the first directional control valve is configured by the second switching position for connecting the first valve port to the first flushing port, or connects them to each other. The second directional control valve is configured by the first switching position for connecting the second cylinder port to the second valve port, or connects them to each other. In addition, the second directional control valve is configured by the second switching position for connecting the second valve port to the second flushing port, or connects them to each other. In particular, the first cylinder port, the second cylinder port, the first flushing port, the second flushing port, the first valve port and/or the second valve port may be different. In addition or alternatively, the first directional control valve may not or does not need to be configured by the first switching position for connecting the first cylinder port to the first flushing port and for connecting the first valve port to the first flushing port, or may not or does not need to connect them to each other. Further in addition or alternatively, the first directional control valve may not or does not need to be configured by the second switching position for connecting the first cylinder port to the first valve port and for connecting the first cylinder port to the first flushing port, or may not or does not need to connect them to each other. Further in addition or alternatively, the second directional control valve may not or does not need to be configured by the first switching position for connecting the second cylinder port to the second flushing port and for connecting the second valve port to the first flushing port, or may not or does not need to connect them to each other. Further in addition or alternatively, the second directional control valve may not or does not need to be configured by the second switching position for connecting the second cylinder port to the second valve port and for connecting the second cylinder port to the second flushing port, or may not or does not need to connect them to each other.

In a development of the invention, the first directional control valve is a first at least 3-way/at least 2-way directional control valve, in particular a first 4/2-way directional control valve, in particular having a first unused port. In addition or alternatively, the second directional control valve is a second at least 3-way/at least 2-way directional control valve, in particular a second 4/2-way directional control valve, in particular having a second unused port. This permits the switching positions and the connections. In particular, the first 4/2-way directional control valve and/or the second 4/2-way directional control valve permit/permits the use of at least one standard component. This therefore permits a cost-effective construction of the hydraulic drive system.

In a development of the invention, the first directional control valve is a first cartridge valve and/or a first unit-type valve. In addition or alternatively, the second directional control valve is a second cartridge valve and/or a second unit-type valve. This permits a large flow and/or a large pressure of hydraulic fluid.

In a development of the invention, the first directional control valve and/or the second directional control valve are designed to be electrically switchable. In particular, the first directional control valve and/or the second directional control valve are/is designed to switch independently unenergized into the, in particular respective, second switching position. This permits easy switching of the first directional control valve and/or the second directional control valve. In particular, this permits, in particular the first directional control valve in the second switching position and the second directional control valve in the second switching position permit, a flushing hydraulic fluid shut-off function. In particular, the first directional control valve and/or the second directional control valve may not be or do not need to be designed to be hydraulically switchable. In addition or alternatively, the wording "in an unenergized state" can be used synonymously for the term "unenergized". Alternatively, the first directional control valve and/or the second directional control valve can be designed to switch independently unenergized into the, in particular respective, first switching position.

In a development of the invention, the first directional control valve is configured by the first switching position for connecting a side, in particular a bottom side, of the first drive cylinder to the second directional control valve. The second directional control valve is configured by the first switching position for connecting a side, which is identical, in particular similar, to the side of the first drive cylinder, in particular a bottom side, of the second drive cylinder, to the first directional control valve. This permits, in particular the first directional control valve in the first switching position and the second directional control valve in the first switching position permit, a connection of the same sides of the first drive cylinder and the second drive cylinder to each other. Thus, this permits a cylinder-lock function, particularly advantageously when connecting the bottom sides of the first drive cylinder and the second drive cylinder to each other.

In a development of the invention, the hydraulic drive system has a first drive piston and a second drive piston, a first piston rod and a second piston rod and at least, in particular only, one, in particular a single, water tank. The first drive piston is arranged in the first drive cylinder. The second drive piston is arranged in the second drive cylinder. The first piston rod is fastened to the first drive piston. The second piston rod is fastened to the second drive piston. Furthermore, the first piston rod and the second piston rod are guided through the at least one water tank. The cylinder lock function, particularly when connecting the bottom sides of the first drive cylinder and the second drive cylinder to each other, allows an overflow of the at least one water tank to be prevented, especially when a drive cylinder is pushed back. In particular, the first drive piston and the second drive piston may be similar and/or different. In addition or alternatively, the first piston rod and the second piston rod may be similar and/or different.

In a development of the invention, the hydraulic drive system has an oscillation connection. The oscillation connection connects the first drive cylinder and the second drive cylinder to each other. This is advantageous when connecting the same sides, in particular the bottom sides, of the first drive cylinder and the second drive cylinder to each other. In particular, the oscillation connection can connect a side different from the side, in particular a rod side, of the first drive cylinder and a side different from the side, in particular a rod side, of the second drive cylinder to each other. In addition or alternatively, the oscillation connection may have, in particular be, an oscillation conduit.

In particular, the rod side can designate that side of the drive cylinder to which the piston rod can be fastened to the drive piston. In addition or alternatively, the bottom side can designate the averted or opposite side of the drive cylinder. Further in addition or alternatively, the first drive piston and the second drive piston can be coupled, in particular in the opposite phase, by means of the oscillation connection.

In a development of the invention, the flushing hydraulic fluid device has a hydraulic fluid tank, in particular and a hydraulic fluid cooler and/or a hydraulic fluid cleaner. This allows for stockpiling or storage, in particular and cooling and/or cleaning of, in particular, flushed, hydraulic fluid. In particular, the hydraulic fluid cleaner may have, in particular be, a filter.

In a development of the invention, the first directional control valve and the second directional control valve are switchable independently of each other. This permits a multiplicity of functions. In particular, the term “separately” can be used synonymously for the term “independently”.

In a development of the invention, the hydraulic drive system has a control device. The control device is configured for switching the first directional control valve into the first switching position and/or the second switching position and the second directional control valve into the first switching position and/or into the second switching position, in particular for an alternating flushing function, an, in particular the, flushing hydraulic fluid shut-off function and/or an, in particular the, cylinder lock function. This permits good, in particular simple and/or cost-effective, operation of the hydraulic drive system and/or, in particular therefore, of the construction and/or thick matter pump system. In particular, the control device may be electrical. In addition or alternatively, the control device may have, in particular be, a processor and/or a memory. Further in addition or alternatively, the term “actuation device” or “controlling device” may be used synonymously for the term “control device”. Further in addition or alternatively, the term “adjusting”, “activating” or “controlling” may be used synonymously for the term “switching”. Further in addition or alternatively, the switching may be automatic.

In particular, the alternating flushing function permits, in particular realizes, a flushing of hydraulic fluid, in particular of the first drive cylinder and/or the second drive cylinder.

In addition or alternatively, the flushing hydraulic fluid shut-off function permits, in particular realizes, avoiding flushing of hydraulic fluid, in particular and a connection, in particular of the same sides, of the first drive cylinder and the second drive cylinder to each other. In addition or alternatively, the flushing hydraulic fluid shut-off function permits delayed switching of valves during a reversing operation. In particular, the reversing operation can be the most critical moment in which low-pressure drops may occur. The flushing hydraulic fluid shut-off function just before reversing can significantly reduce or even prevent these low-pressure drops. This can have a positive effect on the service life of main pumps of the hydraulic drive system.

Further in addition or alternatively, the cylinder lock function, particularly when connecting the bottom sides of the first drive cylinder and the second drive cylinder to each other, allows an overflow of the at least one water tank to be prevented, especially when a drive cylinder is pushed back, in particular and to avoid flushing of hydraulic fluid.

In one refinement of the invention, the hydraulic drive system has at least one sensor. The at least one sensor is designed for detecting a temperature, in particular a value of the temperature, or a temperature variable, which is dependent on the temperature, in particular a value of the temperature variable, and/or a degree of contamination, in particular a value of the degree of contamination, or a degree of contamination variable, which is dependent on the degree of contamination, in particular a value of the degree of contamination variable, of the hydraulic drive system and/or hydraulic fluid. The control device is configured for switching, in particular for the alternating flushing function, depending on the detected temperature or the detected temperature variable and/or the detected degree of contamination or the detected degree of contamination variable. This permits switching, in particular flushing, depending on requirements. This therefore permits faster warming up and/or, in particular therefore, reduced wear of the hydraulic drive system. This therefore permits good, in particular reliable and/or cost-effective, operation of the hydraulic drive system and/or, in particular therefore, of the construction and/or thick matter pump system. In particular, the sensor may be electrical. In addition or alternatively, the detection may be automatic. Further in addition or alternatively, the hydraulic fluid cannot be flushed.

The construction and/or thick matter pump system according to the invention has a construction and/or thick matter conveying system and a, in particular the, hydraulic drive system, as mentioned above. The construction and/or thick matter conveying system is designed for conveying construction and/or thick matter. The hydraulic drive system is designed for driving the construction and/or thick matter conveying system. In particular, the conveying and/or drive may be automatic. In addition or alternatively, thick matter refers to sludge. Further in addition or alternatively, construction and/or thick matter may refer to mortar, cement, screed, concrete and/or plaster. In particular, the construction and/or thick matter pump system may be referred to as a concrete pump system. Further in addition or alternatively, the construction and/or thick matter pump system may be designed to be mobile, in particular as a truck-mounted construction and/or thick matter pump system, in particular as a truck.

The method according to the invention for operating an, in particular the, hydraulic drive system, as mentioned above, and/or a, in particular the, construction and/or thick matter pump system, as mentioned above, comprises in particular the step of: switching the first directional control valve into the first switching position or the second switching position and the second directional control valve into the first switching position or the second switching position, in particular for an, in particular the, alternating flushing function, an, in particular the, flushing hydraulic fluid shut-off function or an, in particular the, cylinder lock function. In particular, the method and/or the operation and/or the switching may be automatic.

Further advantages and aspects of the invention emerge from the claims and from the description of exemplary embodiments of the invention, which are discussed below on the basis of the figures.

DETAILED DESCRIPTION OF THE DRAWINGS

Figure 1:
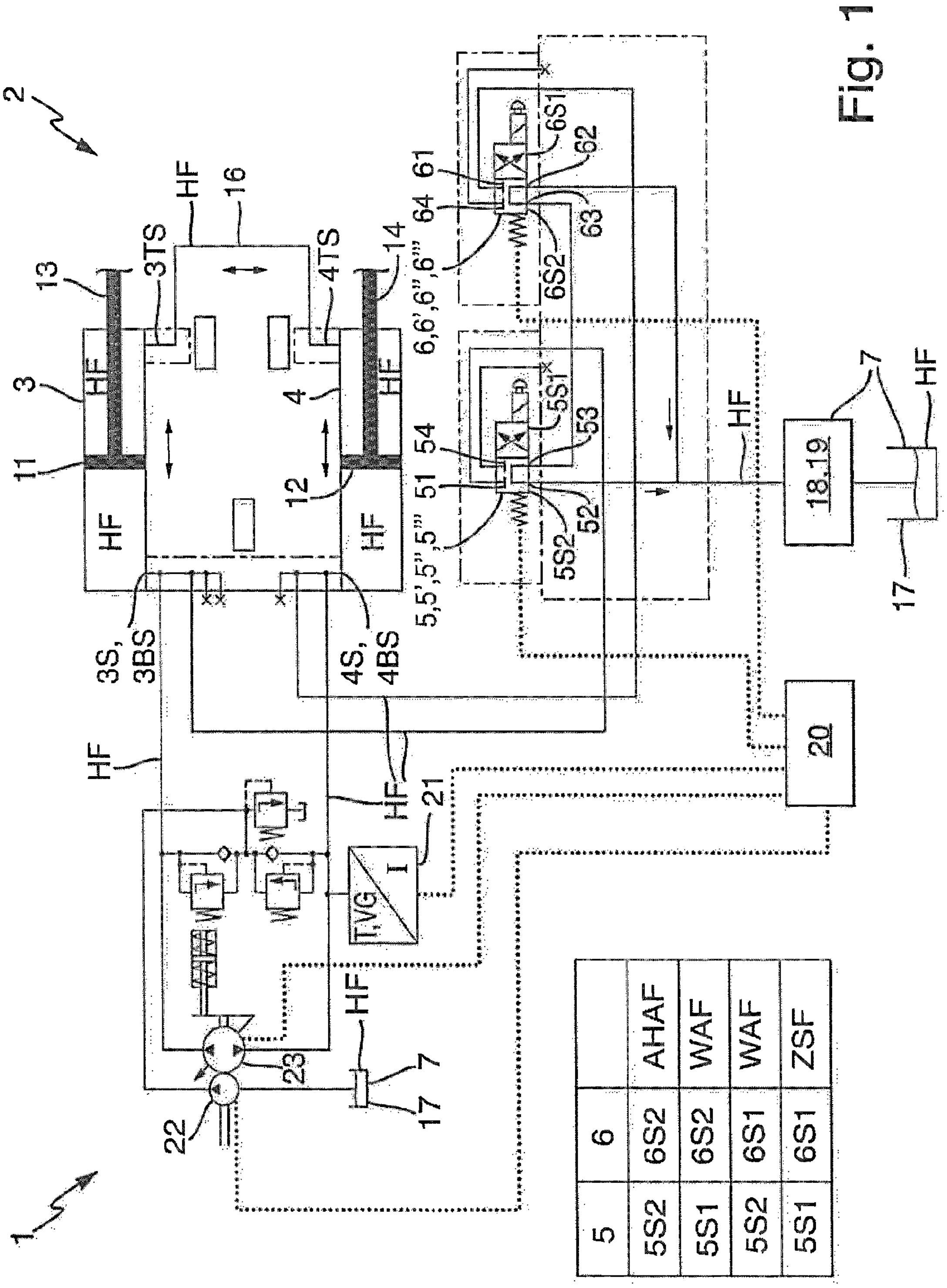
FIG. 1 is a schematic circuit diagram of a hydraulic drive system of a construction and/or thick matter pump system according to an embodiment of the invention.
Figure 2:
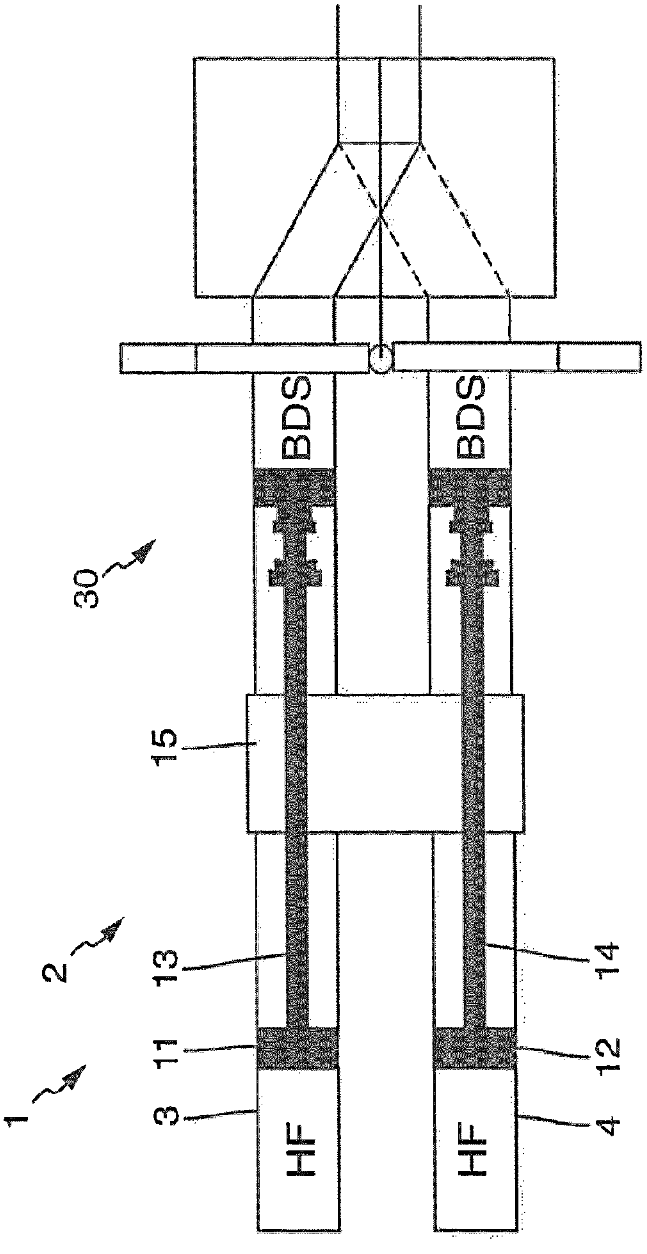
FIG. 2 is a schematic circuit diagram of a detail of the hydraulic drive system of FIG. 1 and a construction and/or thick matter conveying system of the construction and/or thick matter pump system according to the invention.

FIGS. 1 to 4 show a hydraulic drive system 1 for a construction and/or thick matter pump system 2. The hydraulic drive system 1 has a first drive cylinder 3 and a second drive cylinder 4, a first directional control valve 5 and a second directional control valve 6, and a flushing hydraulic fluid device 7. The first directional control valve 5 is configured by a first switching position 5S1 for connecting the first drive cylinder 3 to the second directional control valve 6, in particular connects them to each other. Furthermore, the first directional control valve 5 is formed by a second switching position 5S2 for connecting the second directional control valve 6 to the flushing hydraulic fluid device 7, in particular connects them to each other. The second directional control valve 6 is configured by a first switching position 6S1 for connecting the second drive cylinder 4 to the first directional control valve 5, in particular connects them to each other. In addition, the second directional control valve 6 is configured by a second switching position 6S2 for connecting the first directional control valve 5 to the flushing hydraulic fluid device 7, in particular connects them to each other.

In detail, the first directional control valve 5 is configured by the first switching position 5S1 not for connecting the first drive cylinder 3 to the flushing hydraulic fluid device 7 and not for connecting the second directional control valve 6 to the flushing hydraulic fluid device 7, in particular does not connect them to each other. In addition or alternatively, the first directional control valve 5 is configured by the second switching position 5S2 not for connecting the first drive cylinder 3 to the second directional control valve 6 and not for connecting the first drive cylinder 3 to the flushing hydraulic fluid device 7, in particular does not connect them to each other. Further in addition or alternatively, the second directional control valve 6 is configured by the first switching position 6S1 not for connecting the second drive cylinder 4 to the flushing hydraulic fluid device 7 and not for connecting the first directional control valve 5 to the flushing hydraulic fluid device 7, in particular does not connect them to each other. Further in addition or alternatively, the second directional control valve 6 is configured by the second switching position 6S2 not for connecting the second drive cylinder 4 to the first directional control valve 5 and not for connecting the second drive cylinder 4 to the flushing hydraulic fluid device 7, in particular does not connect them to each other.

In addition, a first cylinder port 51 of the first directional control valve 5 is connected to the first drive cylinder 3. A second cylinder port 61 of the second directional control valve 6 is connected to the second drive cylinder 4. A first flushing port 52 of the first directional control valve 5 is connected to the flushing hydraulic fluid device 7. A second flushing port 62 of the second directional control valve 6 is connected to the flushing hydraulic fluid device 7. A first valve port 53 of the first directional control valve 5 and a second valve port 63 of the second directional control valve 6 are connected to each other. The first directional control valve 5 is configured by the first switching position 5S1 for connecting the first cylinder port 51 to the first valve port 53, in particular connects them to each other. Furthermore, the first directional control valve 5 is configured by the second switching position 5S2 for connecting the first valve port 53 to the first flushing port 52, in particular connects them to each other. The second directional control valve 6 is configured by the first switching position 6S1 for connecting the second cylinder port 61 to the second valve port 63, in particular connects them to each other. In addition, the second directional control valve 6 is configured by the second switching position 6S2 for connecting the second valve port 63 to the second flushing port 62, in particular connects them to each other.

Furthermore, the first directional control valve 5 is a first at least 3-way/at least 2-way directional control valve 5', in particular a first 4/2-way directional control valve 5'', in particular having a first unused port 54. In addition or alternatively, the second directional control valve 6 is a second at least 3-way/at least 2-way directional control valve 6', in particular a second 4/2-way directional control valve 6'', in particular having a second unused port 64.

In addition, the first directional control valve 5 is a first cartridge valve 5''' and/or a first unit-type valve 5''''. In addition or alternatively, the second directional control valve 6 is a second cartridge valve 6''' and/or a second unit-type valve 6''''.

Furthermore, the first directional control valve 5 and/or the second directional control valve 6 are designed to be electrically switchable. In particular, the first directional control valve 5 and/or the second directional control valve 6 are/is designed to switch independently unenergized into the second switching position 5S2, 6S2.

In addition, the first directional control valve 5 is configured by the first switching position 5S1 for connecting a side 3S, in particular a bottom side 3BS, of the first drive cylinder 3 to the second directional control valve 6. The second directional control valve 6 is configured by the first switching position 6S1 for connecting a side 4S, which is identical to the side 3S of the first drive cylinder 3, in particular a bottom side 4BS, of the second drive cylinder 4, to the first directional control valve 5.

Furthermore, the hydraulic drive system 1 has a first drive piston 11 and a second drive piston 12, a first piston rod 13 and a second piston rod 14, and at least one water tank 15. The first drive piston 11 is arranged in the first drive cylinder 3. The second drive piston 12 is arranged in the second drive cylinder 4. The first piston rod 13 is fastened to the first drive piston 11. The second piston rod 14 is fastened to the second drive piston 12. Furthermore, the first piston rod 13 and the second piston rod 14 are guided through the at least one water tank 15.

In addition, the hydraulic drive system 1 has an oscillation connection 16. The oscillation connection 16 connects the first drive cylinder 3 and the second drive cylinder 4 to each other.

In particular, the oscillation connection 16 connects a rod side 3TS of the first drive cylinder 3 and a rod side 4TS of the second drive cylinder 4 to each other.

Furthermore, the flushing hydraulic fluid device 7 has a hydraulic fluid tank 17, in particular and a hydraulic fluid cooler 18 and/or a hydraulic fluid cleaner 19.

In addition, the first directional control valve 3 and the second directional control valve 4 are switchable independently of each other.

Furthermore, the hydraulic drive system 1 has a control device 20. The control device 20 is configured for switching, in particular switches, the first directional control valve 5 into the first switching position 5S1 and/or the second switching position and the second directional control valve 6 into the first switching position 6S1 and/or into the second switching position, in particular for an alternating flushing function WAF, a flushing hydraulic fluid shut-off function AHAF and/or a cylinder lock function ZSF.

In particular, the first directional control valve 5 in the first switching position 5S1 and the second directional control valve 6 in the second switching position 6S2 permit, in particular realize, the alternating flushing function WAF, in particular for the first drive cylinder 3. The alternating flushing function WAF permits, in particular realizes, flushing, in particular of a flow, of hydraulic fluid HF, in particular from the first drive cylinder 3 to the first directional control valve 5, from the first directional control valve 5 to the second directional control valve 6, and from the second directional control valve 6 to the flushing hydraulic fluid device 7.

In addition or alternatively, the first directional control valve 5 in the second switching position 5S2 and the second directional control valve 6 in the first switching position 6S2 permit, in particular realize, the alternating flushing function WAF, in particular for the second drive cylinder 4. The alternating flushing function WAF permits, in particular realizes, flushing, in particular of a flow, of hydraulic fluid HF, in particular from the second drive cylinder 4 to the second directional control valve 6, from the second directional control valve 6 to the first directional control valve 5, and from the first directional control valve 5 to the flushing hydraulic fluid device 7.

In particular, the control device 20 for switching the alternating flushing function WAF for the first drive cylinder 3 and the second drive cylinder 4 cyclically is interchanged, in particular during operation of the hydraulic drive system 1 and/or the construction and/or thick matter pump system 2.

Further in addition or alternatively, the first directional control valve 5 in the second switching position 5S2 and the second directional control valve 6 in the second switching position 6S2 permit, in particular realize, the flushing hydraulic fluid shut-off function AHAF. The flushing hydraulic fluid shut-off function AHAF permits, in particular realizes, avoiding flushing, in particular a flow, of hydraulic fluid HF, in particular from the first drive cylinder 3 and/or the second drive cylinder 4 to the flushing hydraulic fluid device 7.

Further in addition or alternatively, the first directional control valve 5 in the first switching position 5S1 and the second directional control valve 6 in the first switching position 6S1 permit, in particular realize, the cylinder lock function ZSF. The cylinder lock function ZSF permits, in particular realizes, a connection of the same sides 3S, 4S, in particular the bottom sides 3BS, 4BS, of the first drive cylinder 3 and the second drive cylinder 4 to each other, and/or, in particular therefore, a flow of hydraulic fluid HF from the first drive cylinder 3 to the first directional control valve 5, from the first directional control valve 5 to the second directional control valve 6, and from the second directional control valve 6 to the second drive cylinder 4, and/or from the second drive cylinder 4 to the second directional control valve 6, from the second directional control valve 6 to the first directional control valve 5 and from the first directional control valve 5 to the first drive cylinder 3.

In particular, the control device 20 is not configured for switching the cylinder lock function ZSF during operation of the hydraulic drive system 1 and/or the construction and/or thick matter pump system 2, in particular when the diesel engine of the truck is switched off.

In addition, the hydraulic drive system 1 has at least one sensor 21. The at least one sensor 21 is designed for detecting, in particular detects, a temperature T or a temperature variable, which is dependent on the temperature, and/or a degree of contamination VG or a degree of contamination variable, which is dependent on the degree of contamination, of the hydraulic drive system 1 and/or hydraulic fluid HF. The control device is configured for switching, in particular switches, in particular for the alternating flushing function WAF, depending on the detected temperature T or the detected temperature variable and/or the detected degree of contamination VG or the detected degree of contamination variable.

In addition, the hydraulic drive system 1 has at least one feed pump 22 and/or at least one drive pump 23. The feed pump 22 is designed for, in particular automatic, feeding, in particular feeds, in particular a flow, of hydraulic fluid HF from the flushing hydraulic fluid device 7, in particular the hydraulic fluid tank 17, and/or to the first drive cylinder 3 and/or the second drive cylinder 4. In addition or alternatively, the drive pump 23 is designed for, in particular automatic, generating, in particular generates and therefore moves, a flow, in particular a drive flow, of hydraulic fluid HF for, in particular automatic, movement of the first drive piston 11 and/or the second drive piston 12.

In particular, the flushing hydraulic fluid device 7, in particular the hydraulic fluid tank 17, the feed pump 22, the drive pump 23, the first drive cylinder 3 and the second drive cylinder 4, in particular by means of the oscillation connection 16, the first directional control valve 5 and the second directional control valve 6 and/or the flushing hydraulic fluid device 7, in particular the hydraulic fluid tank 17, form a drive circuit for hydraulic fluid HF.

Furthermore, in the exemplary embodiment shown, the first directional control valve 5 and the second directional control valve 6 are installed or constructed in an, in particular common, valve block or control block. In alternative exemplary embodiments, the first directional control valve and the second directional control valve may not be, or do not need to be, installed in a valve block.

Figure 3:
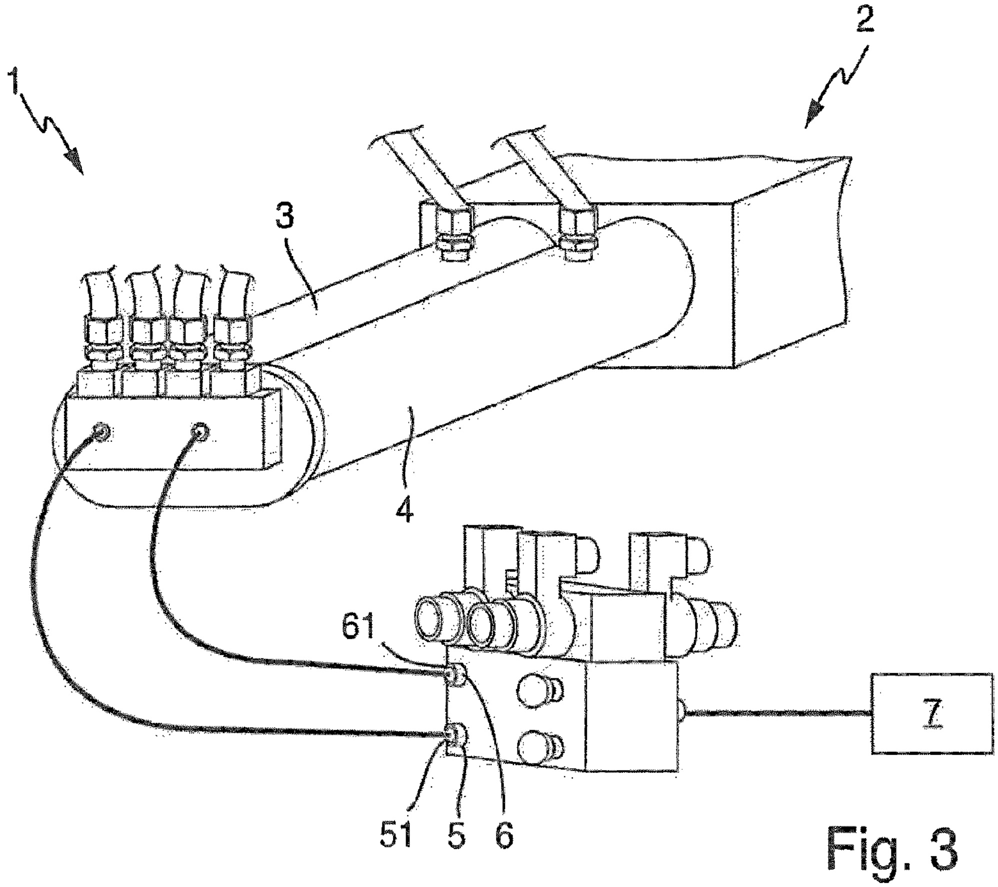
FIG. 3 is a schematic perspective view of a detail of the hydraulic drive system of FIG. 1 having a separate valve block.

In FIG. 3, the valve block is separate or detached from the first drive cylinder 3 and the second drive cylinder 4.

Figure 4:
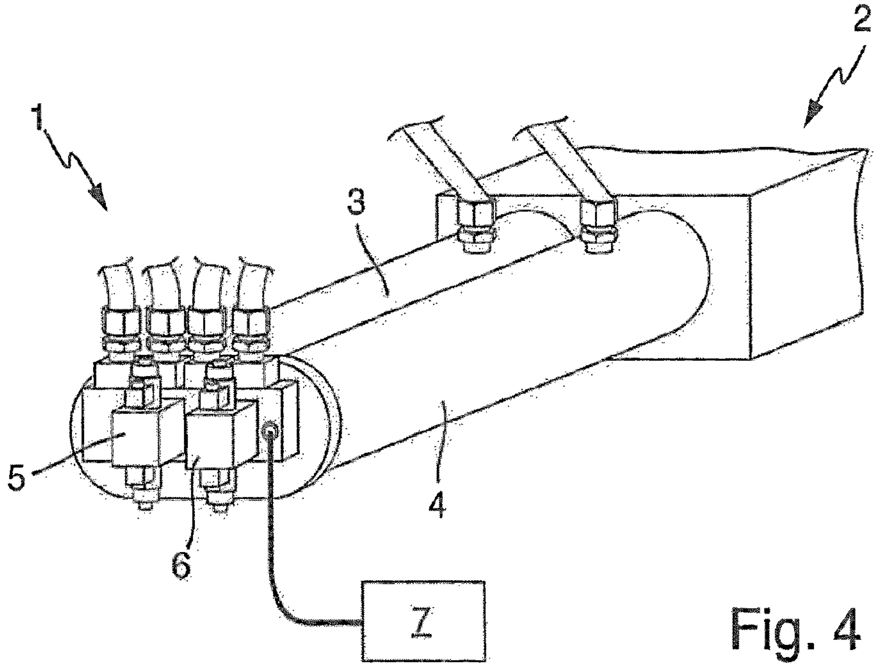
FIG. 4 is a schematic perspective view of a detail of the hydraulic drive system of FIG. 1 having an integrated valve block.

In FIG. 4, the valve block, the first drive cylinder 3 and the second drive cylinder 4 are integrated. In other words: the first directional control valve 5 and the second directional control valve 6 are integrated in a connection block directly on the first drive cylinder 3 and the second drive cylinder 4. This makes it possible to save on connecting conduits and the additional block. In particular, all of the bores are integrated directly in the "large connection block" on the first drive cylinder 3 and the second drive cylinder 4. There is, in particular just, one outward connection leading to the flushing hydraulic fluid device 7, in particular the hydraulic fluid tank 17 and/or the hydraulic fluid cooler 18 and/or the hydraulic fluid cleaner 19.

FIGS. 1 to 4 show the construction and/or thick matter pump system 2 according to the invention. The construction and/or thick matter pump system 2 has a construction and/or thick matter conveying system 30 and the hydraulic drive system 1. The construction and/or thick matter conveying system 30 is designed for conveying, in particular conveys, construction and/or thick matter BDS. The hydraulic drive system 1 is designed for driving, in particular drives, the construction and/or thick matter conveying system 30.

In detail, the construction and/or thick matter conveying system 30 has a first conveying cylinder and a second conveying cylinder and a first conveying piston and a second conveying piston. The first conveying piston is arranged in the first conveying cylinder. The second conveying piston is arranged in the second conveying cylinder. The first piston rod 13 is fastened to the first conveying piston for movement coupling to the first drive piston 11. The second piston rod 14 is fastened to the second conveying piston for movement coupling to the second drive piston 12.

Otherwise, reference is made to the specialist literature regarding the hydraulic drive system 1, the construction and/or thick matter pump system 2 and/or the construction and/or thick matter conveying system 30.

FIG. 1 shows a method for operating the hydraulic drive system 1 and/or the construction and/or thick matter pump system 2. The method comprises: switching the first directional control valve 5 into the first switching position 5S1 or the second switching position 5S2 and the second directional control valve 6 into the first switching position 6S1 or the second switching position 6S2, in particular for the alternating flushing function WAF, the flushing hydraulic fluid shut-off function AHAF or the cylinder lock function ZSF, in particular by means of the control device 20.

In addition, the control device 20 with the first directional control valve 5 and/or the second directional control valve 6 and/or the at least one sensor 21 and/or the feed pump 22 and/or the drive pump 23 has, in particular in each case, one, in particular electrical, connection, in particular switching or signal connection.

As the exemplary embodiments which are shown and mentioned above make clear, the invention provides an advantageous hydraulic drive system for a construction and/or thick matter pump system, an advantageous construction and/or thick matter pump system having such a hydraulic drive system, and an advantageous method for operating such a hydraulic drive system and/or such a construction and/or thick matter pump system, in each case having improved properties.

What is claimed is:

1. A hydraulic drive system for a construction and/or thick matter pump system, comprising:

a first drive cylinder and a second drive cylinder;

a first directional control valve and a second directional control valve; and a flushing hydraulic fluid device, wherein the first directional control valve is configured with a first switching position (5S1) for connecting the first drive cylinder to the second directional control valve and a second switching position (5S2) for connecting the second directional control valve to the flushing hydraulic fluid device, and wherein the second directional control valve is configured with a first switching position (6S1) for connecting the second drive cylinder to the first directional control valve and a second switching position (6S2) for connecting the first directional control valve to the flushing hydraulic fluid device.

2. The hydraulic drive system as claimed in claim 1, wherein the first directional control valve is configured not to connect the first drive cylinder to the flushing hydraulic fluid device and not to connect the second directional control valve to the flushing hydraulic fluid device by way of the first switching position, and/or not to connect the first drive cylinder to the second directional control valve and not to connect the first drive cylinder to the flushing hydraulic fluid device by way of the second switching position, and/or wherein the second directional control valve is configured not to connect the second drive cylinder to the flushing hydraulic fluid device and not to connect the first directional control valve to the flushing hydraulic fluid device by way of the first switching position, and/or not to connect the second drive cylinder to the first directional control valve and not to connect the second drive cylinder to the flushing hydraulic fluid device by way of the second switching position.

3. The hydraulic drive system as claimed in claim 1, wherein a first cylinder port of the first directional control valve is connected to the first drive cylinder, and wherein a second cylinder port of the second directional control valve is connected to the second drive cylinder, wherein a first flushing port of the first directional control valve is connected to the flushing hydraulic fluid device, and wherein a second flushing port of the second directional control valve is connected to the flushing hydraulic fluid device, and wherein a first valve port of the first directional control valve and a second valve port of the second directional control valve are connected to each other, wherein the first directional control valve is configured, in the first switching position, for connecting the first cylinder port to the first valve port and, in the second switching position, for connecting the first valve port to the first flushing port, and wherein the second directional control valve is configured, in the first switching position, for connecting the second cylinder port to the second valve port and, in the second switching position, for connecting the second valve port to the second flushing port.

4. The hydraulic drive system as claimed in claim 1, wherein the first directional control valve is a first at least 3/at least 2-way directional control valve having a first unused port, and/or wherein the second directional control valve is a second at least 3/at least 2-way directional control valve having a second unused port.

5. The hydraulic drive system as claimed in claim 1, wherein the first directional control valve is a first cartridge valve and/or a first unit-type valve, and/or wherein the second directional control valve is a second cartridge valve and/or a second unit-type valve.

6. The hydraulic drive system as claimed in claim 1, wherein the first directional control valve and/or the second directional control valve are/is configured to be electrically switchable.

7. The hydraulic drive system as claimed in claim 1, wherein the first directional control valve and/or the second directional control valve are/is configured to switch independently unenergized into the second switching position.

8. The hydraulic drive system as claimed in claim 1, wherein the first directional control valve is configured by the first switching position for connecting a side of the first drive cylinder to the second directional control valve, and wherein the second directional control valve is configured by the first switching position for connecting a side, which is identical to the side of the first drive cylinder, of the second drive cylinder to the first directional control valve.

9. The hydraulic drive system as claimed in claim 1, further comprising:

a first drive piston and a second drive piston, wherein the first drive piston is arranged in the first drive cylinder, and wherein the second drive piston is arranged in the second drive cylinder, a first piston rod and a second piston rod, wherein the first piston rod is fastened to the first drive piston, and wherein the second piston rod is fastened to the second drive piston, and at least one water tank, wherein the first piston rod and the second piston rod are guided through the at least one water tank.

10. The hydraulic drive system as claimed in claim 1, further comprising:

an oscillation connection, wherein the oscillation connection connects the first drive cylinder and the second drive cylinder to each other.

11. The hydraulic drive system as claimed in claim 1, wherein the flushing hydraulic fluid device has a hydraulic fluid tank, a hydraulic fluid cooler and/or a hydraulic fluid cleaner.

12. The hydraulic drive system as claimed in claim 1, wherein the first directional control valve and the second directional control valve are switchable independently of each other.

13. The hydraulic drive system as claimed in claim 1, further comprising:

a control device, wherein the control device is configured for switching the first directional control valve into the first switching position and/or into the second switching position and the second directional control valve into the first switching position and/or into the second switching position, for an alternating flushing function, a flushing hydraulic fluid shut-off function and/or a cylinder lock function.

14. The hydraulic drive system as claimed in claim 13, further comprising:

at least one sensor, wherein the at least one sensor is configured for detecting a temperature or a temperature variable, which is dependent on the temperature, and/or a degree of contamination or a degree of contamination variable, which is dependent on the degree of contamination, of the hydraulic drive system and/or hydraulic fluid, and wherein the control device is configured for switching depending on the detected temperature or the detected temperature variable and/or the detected degree of contamination or the detected degree of contamination variable.

15. A construction and/or thick matter pump system, comprising;

a construction and/or thick matter conveying system, wherein the construction and/or thick matter conveying system is configured for conveying construction and/or thick matter; and a hydraulic drive system as claimed in claim 1, wherein the hydraulic drive system is configured for driving the construction and/or thick matter conveying system.

16. A method for operating a hydraulic drive system, wherein the method comprises:

providing the hydraulic drive system with:

a first drive cylinder and a second drive cylinder;

a first directional control valve and a second directional control valve; and a flushing hydraulic fluid device, wherein the first directional control valve is configured with a first switching position (5S1) for connecting the first drive cylinder to the second directional control valve and a second switching position (5S2) for connecting the second directional control valve to the flushing hydraulic fluid device, and wherein the second directional control valve is configured with a first switching position (6S1) for connecting the second drive cylinder to the first directional control valve and a second switching position (6S2) for connecting the first directional control valve to the flushing hydraulic fluid device; and switching the first directional control valve into the first switching position or into the second switching position and the second directional control valve into the first switching position or into the second switching position, for an alternating flushing function, a flushing hydraulic fluid shut-off function, or a cylinder lock function.

* * * * *